(12) United States Patent
Tadokoro et al.

(10) Patent No.: US 11,939,495 B2
(45) Date of Patent: Mar. 26, 2024

(54) OXYGEN-ABSORBING FILM

(71) Applicant: Toyo Seikan Group Holdings, Ltd., Tokyo (JP)

(72) Inventors: Yoichi Tadokoro, Kanagawa (JP); Yoichi Ishizaki, Kanagawa (JP); Yoshihiro Ohta, Kanagawa (JP)

(73) Assignee: Toyo Seikan Group Holdings, Ltd., Tokyo (JP)

( * ) Notice: Subject to any disclaimer, the term of this patent is extended or adjusted under 35 U.S.C. 154(b) by 282 days.

(21) Appl. No.: 16/986,470

(22) Filed: Aug. 6, 2020

(65) Prior Publication Data

US 2020/0362211 A1    Nov. 19, 2020

Related U.S. Application Data

(62) Division of application No. 14/759,420, filed as application No. PCT/JP2014/050972 on Jan. 20, 2014, now Pat. No. 10,774,248.

(30) Foreign Application Priority Data

Jan. 18, 2013  (JP) ................. 2013-007658
Jan. 18, 2013  (JP) ................. 2013-007659

(51) Int. Cl.
| | | |
|---|---|---|
| C09J 167/02 | (2006.01) | |
| B65D 81/26 | (2006.01) | |
| C08L 67/00 | (2006.01) | |
| C09J 7/20 | (2018.01) | |
| C09J 11/08 | (2006.01) | |
| C09J 167/06 | (2006.01) | |
| C09J 175/04 | (2006.01) | |

(52) U.S. Cl.
CPC .......... *C09J 167/02* (2013.01); *B65D 81/266* (2013.01); *C08L 67/00* (2013.01); *C09J 7/20* (2018.01); *C09J 11/08* (2013.01); *C09J 167/06* (2013.01); *C09J 175/04* (2013.01)

(58) Field of Classification Search
CPC ...... C09J 167/02; C09J 167/06; C09J 175/04; C08G 63/183; C08G 63/54; C08G 18/4213; C08G 18/73; C08L 67/00; B65D 81/266
See application file for complete search history.

(56) References Cited

U.S. PATENT DOCUMENTS

| | | |
|---|---|---|
| 4,318,837 A | 3/1982 | Streets et al. |
| 5,900,473 A | 5/1999 | Acevedo et al. |
| 6,302,994 B1 | 10/2001 | Kamiya et al. |
| 6,713,184 B1 | 3/2004 | Ferencz et al. |
| 8,673,173 B2 | 3/2014 | Ishizaki et al. |
| 2007/0036923 A1 | 2/2007 | Ishizaki et al. |
| 2009/0098323 A1 | 4/2009 | Ohta et al. |
| 2012/0001121 A1 | 1/2012 | Ishizaki et al. |
| 2013/0143734 A1 | 6/2013 | Ohta et al. |
| 2013/0280537 A1 | 10/2013 | Ohta et al. |

FOREIGN PATENT DOCUMENTS

| | | |
|---|---|---|
| CN | 101466761 A | 6/2009 |
| JP | 11-005959 | 1/1999 |
| JP | 11-005960 | 1/1999 |
| JP | 2001-526297 A | 12/2001 |
| JP | 2009035708 A | 2/2009 |
| JP | 2011144281 A | 7/2011 |
| JP | 2011-184482 A | 9/2011 |
| JP | 2013-006893 A | 1/2013 |
| WO | WO-2005/105887 A1 | 11/2005 |
| WO | WO-2010/0101290 A1 | 9/2010 |
| WO | WO-2012/023555 A1 | 2/2012 |
| WO | WO-2012/090900 A1 | 7/2012 |

OTHER PUBLICATIONS

Maria Cristina Righetti "Thermal properties of poly(butylene isophthalate) and its copolyesters with poly(butylene adipate)", Macromol. Chem. Phys. 195,2039-2047 (1994) (Year: 1994).*
Ioannis M. Kalogeras et al "Glass Transition Temperatures In Binary Polymer Blends", Journal of Polymer Science: Part B: Polymer Physics, vol. 47, 80-95 (2009) (Year: 2009).*
Witold Brostow et al "Prediction of glass transition temperatures: Binary blends and copolymers", Materials Letters 62 (2008) 3152-3155 (Year: 2008).*
Search Report and Written Opinion in International Application No. PCT/JP2014/050972 dated Apr. 22, 2014, 7 pages.
Office Action in JP Application No. 2013-007659 dated Jun. 20, 2016, 4 pages.
Office Action in Chinese Application No. 201480007050.0 dated Jul. 5, 2016, 5 pages.

(Continued)

*Primary Examiner* — Frances Tischler
*Assistant Examiner* — Gennadiy Mesh
(74) *Attorney, Agent, or Firm* — MARSHALL, GERSTEIN & BORUN LLP

(57) ABSTRACT

An oxygen-absorbing film having an oxygen-absorbing adhesive agent layer including a cured oxygen-absorbing adhesive agent resin composition, wherein the oxygen-absorbing adhesive agent layer has at least two glass transition temperatures, and wherein the lowest glass transition temperature among the glass transition temperatures is lower than 0° C. The cured oxygen-absorbing adhesive agent resin composition preferably includes: (A) an oxygen-absorbing polyester resin having a glass transition temperature of −20 to 10° C. and (B) a saturated polyester resin having a glass transition temperature of −10° C. or lower. The oxygen-absorbing polyester-based resin (A) is made from a tetrahydrophthalic acid, a derivative thereof, a tetrahydrophthalic anhydride, or a derivative thereof, and the saturated polyester resin (B) containing a structural unit derived from a diol component and a structural unit derived from a dicarboxylic acid component is preferably selected from the group consisting of adipic acid, sebacic acid, isophthalic acid, and combinations thereof.

12 Claims, No Drawings

(56) References Cited

OTHER PUBLICATIONS

Extended European Search Report in EP Application No. 14740945.2 dated Jul. 12, 2016, 7 pages.
Zhang et al. "Synthesis and Characterization of Poly(butylene succinate-co-butylene malate): A New Biodegradable Copolyester Bearing Hydroxyl Pendant Groups", Biomacromolecules 2003, 4, 437-445.
Succipack Article, 2012, pp. 1-2.

* cited by examiner

OXYGEN-ABSORBING FILM

CROSS-REFERENCE TO RELATED APPLICATIONS

This is a divisional of U.S. application Ser. No. 14/759,420, which is the U.S. national phase of International Application No. PCT/JP2014/050972 filed Jan. 20, 2014, which in turn claims the priority benefit of JP 2013-007658 filed Jan. 18, 2013 and JP 2013-007659 filed Jan. 18, 2013, the entire respective disclosures of which are incorporated by reference herein.

TECHNICAL FIELD

Field of the Invention

The present invention relates to an oxygen-absorbing film and an oxygen-absorbing adhesive resin composition which are excellent in adhesiveness and oxygen absorption ability.

Background Art

Various oxygen-absorbing resin materials have been proposed for use as packaging materials for beverages, foods, and pharmaceuticals (for example, International Patent Application Publication No. WO2005/105887). Further, there has been proposed an oxygen-absorbing adhesive resin composition using such an oxygen-absorbing resin material (see Japanese Patent Application Publication No. 2011-144281 and so forth). However, in an adhesive using such an oxygen-absorbing resin, an internal stress is generated by the influence of the volume shrinkage due to an oxidative curing reaction following the oxygen absorption. This brings about a problem that the laminate strength is lowered after the oxygen absorption.

SUMMARY OF INVENTION

Accordingly, an object of the present invention is to provide an oxygen-absorbing film and an oxygen-absorbing adhesive resin composition which are excellent in adhesiveness and oxygen absorption ability.

The present invention provides an oxygen-absorbing film comprising an oxygen-absorbing adhesive layer made of an oxygen-absorbing adhesive resin composition, wherein the oxygen-absorbing adhesive layer has at least two glass transition temperatures, and the lowest glass transition temperature thereof is less than 0° C.

Moreover, the present invention provides an oxygen-absorbing adhesive resin composition comprising:

an oxygen-absorbing polyester-based resin (A) having a glass transition temperature of −20° C. to 10° C.; and a saturated polyester resin (B) having a glass transition temperature of −10° C. or less.

In the oxygen-absorbing film of the present invention, the oxygen-absorbing adhesive layer has at least two glass transition temperatures, and the lowest glass transition temperature thereof is less than 0° C. Hence, a flexible component having a glass transition temperature of less than 0° C. makes it possible to relax an internal stress generated by an oxidative curing reaction following the oxygen absorption. Thus, the oxygen-absorbing film of the present invention is capable of keeping a high laminate strength before and after the oxygen absorption, while exhibiting an excellent oxygen absorption performance.

Moreover, in the oxygen-absorbing adhesive resin composition of the present invention, the saturated polyester resin (B) having a glass transition temperature of −10° C. or less is added to lower the glass transition temperature of the oxygen-absorbing adhesive resin composition. This makes it possible to relax an internal stress generated by an oxidative curing reaction following the oxygen absorption. Thus, the oxygen-absorbing adhesive resin composition of the present invention is capable of keeping a high laminate strength before and after the oxygen absorption, while exhibiting an excellent oxygen absorption performance.

DESCRIPTION OF EMBODIMENTS

An oxygen-absorbing film of the present invention comprises an oxygen-absorbing adhesive layer made of an oxygen-absorbing adhesive resin composition. The oxygen-absorbing adhesive layer has at least two glass transition temperatures, and the lowest glass transition temperature thereof is less than 0° C.

The oxygen-absorbing adhesive resin composition is a resin composition containing an adhesive resin having a reactivity with oxygen. Examples thereof include acrylic adhesives, urethane-based adhesives, epoxy-based adhesives, ethylene-vinyl acetate-based adhesives, vinyl chloride-based adhesives, silicone-based adhesives, rubber-based adhesives, and the like, all which are provided with an oxygen absorption function. Particularly, for use as an adhesive for dry lamination, urethane-based adhesives are preferable, and a two-part curable urethane-based adhesive containing a combination of an oxygen-absorbing polyester-based main agent and an isocyanate-based curing agent is more preferable.

Of the oxygen-absorbing adhesive layer, a component having the lowest glass transition temperature of less than 0° C. preferably has a glass transition temperature of −70 to −5° C., and more preferably has a glass transition temperature of −40 to −10° C. Components other than the component having the lowest glass transition temperature preferably have a glass transition temperature of −20 to 60° C., and more preferably have a glass transition temperature of 0 to 40° C.

Moreover, preferably, the oxygen-absorbing adhesive layer comprises an oxygen-absorbing polyester-based resin (A), and further comprises a component mainly containing a saturated polyester resin (B) and having a glass transition temperature of less than 0° C.

The oxygen-absorbing polyester-based resin (A) lowers the laminate strength due to an internal stress generated by an oxygen absorption reaction (oxidative curing reaction). On the other hand, the component mainly containing the saturated polyester resin (B) and having a glass transition temperature of less than 0° C. is capable of relaxing an internal stress generated by an oxidative curing reaction, owing to the flexibility of the component. Even in a state where these two components sufficiently dissolve compatibly with each other all the time so that the oxygen-absorbing film has single glass transition temperature, a relatively high laminate strength can be kept. A more preferable state is such that at least the two components do not dissolve compatibly with each other and the phases are separated, that is, a state where the oxygen-absorbing film has glass transition temperatures of at least the two components. By achieving such a state, even if a strong internal stress is generated as a result of increase in the glass transition temperature of the oxygen-absorbing polyester-based resin (A) by the oxidative curing of the component, the component having a glass transition temperature of less than 0° C. effectively relaxes the internal stress. Thus, the high laminate strength can be kept from the start of the oxygen absorption and even after the oxygen absorption.

Note that the oxygen-absorbing film may have glass transition temperatures of two or more components due to the incompatible system even before the oxygen absorption starts. Nevertheless, from the viewpoints of the film appearance and the uniformity of coating film thickness, a preferable material design is such that the oxygen-absorbing film has a single-phase compatible system when the oxygen absorption starts, but has separated glass transition temperatures of two or more components due to reaction-induced phase separation following an oxygen absorption reaction.

The oxygen-absorbing polyester-based resin (A) is a polyester resin having a structure containing a functional group or linking group having a reactivity with oxygen. Examples of the functional group or linking group having a reactivity with oxygen include a carbon-carbon double bond group, an aldehyde group, a phenolic hydroxyl group, and the like. Particularly, a polyester resin having a carbon-carbon double bond group is preferable, and a polyester resin having an unsaturated alicyclic structure is more preferable. This is preferable because the reaction between the unsaturated alicyclic structure and oxygen generates only a small amount of low-molecular-weight degradation components, which are by-products in an autoxidation reaction of the resin. Examples of the polyester resin having an unsaturated alicyclic structure include polyesters using a tetrahydrophthalic acid, a derivative thereof, a tetrahydrophthalic anhydride, or a derivative thereof as a raw material.

The tetrahydrophthalic acid, the derivative thereof, the tetrahydrophthalic anhydride, or the derivative thereof is particularly preferably 4-methyl-$\Delta^3$-tetrahydrophthalic acid, 4-methyl-$\Delta^3$-tetrahydrophthalic anhydride, cis-3-methyl-$\Delta^4$-tetrahydrophthalic acid, or cis-3-methyl-$\Delta^4$-tetrahydrophthalic anhydride. The tetrahydrophthalic acid, the derivative thereof, the tetrahydrophthalic anhydride, or the derivative thereof can be preferably used as a raw material of a resin for an oxygen-absorbing adhesive because of extremely high reactivity with oxygen. Additionally, the tetrahydrophthalic acid, the derivative thereof, the tetrahydrophthalic anhydride, or the derivative thereof can be obtained by structural isomerization of an isomer mixture which contains 4-methyl-$\Delta^4$-tetrahydrophthalic anhydride and is obtained by a reaction of maleic anhydride with a C5 fraction of naphtha mainly containing isoprene and trans-piperylene, and has been produced industrially.

In a case where the oxygen-absorbing polyester resin (A) is polymerized by using the tetrahydrophthalic acid, the derivative thereof, the tetrahydrophthalic anhydride, or the derivative thereof as a raw material, a dicarboxylic acid and a dicarboxylic anhydride may be esterified into a methyl ester or the like.

The oxygen-absorbing polyester-based resin (A) can be produced by a reaction between a diol component and the tetrahydrophthalic acid, the derivative thereof, the tetrahydrophthalic anhydride, or the derivative thereof. Examples of the diol component include ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol, 2-phenylpropanediol, 2-(4-hydroxyphenyl)ethyl alcohol, $\alpha,\alpha$-dihydroxy-1,3-diisopropylbenzene, o-xylene glycol, m-xylene glycol, p-xylene glycol, $\alpha,\alpha$-dihydroxy-1,4-diisopropylbenzene, hydroquinone, 4,4-dihydroxydiphenyl, naphthalenediol, derivatives thereof, and the like. Preferred are aliphatic diols such as diethylene glycol, triethylene glycol, and 1,4-butanediol, and further preferred is 1,4-butanediol. In the case where 1,4-butanediol is used, the oxygen absorption performance of the resin is high, and further the amount of degradation products generated during the oxidation is small.

These can be used alone, or in combination of two or more thereof.

In addition to the tetrahydrophthalic acid, the derivative thereof, the tetrahydrophthalic anhydride, or the derivative thereof, the oxygen-absorbing polyester-based resin (A) may comprise an additional acid component such as an aromatic dicarboxylic acid, an aliphatic dicarboxylic acid, an aliphatic hydroxycarboxylic acid, or a derivative thereof as a raw material.

The aromatic dicarboxylic acid and the derivative thereof include benzenedicarboxylic acids such as phthalic acid, phthalic anhydride, isophthalic acid, and terephthalic acid; naphthalenedicarboxylic acids such as 2,6-naphthalenedicarboxylic acid; anthracenedicarboxylic acids; sulfoisophthalic acid; sulfoisophthalic acid sodium salt; derivatives thereof; and the like. Among these, phthalic acid, phthalic anhydride, isophthalic acid, and terephthalic acid are preferable.

The aliphatic dicarboxylic acid and the derivative thereof include oxalic acid, malonic acid, succinic acid, glutaric acid, adipic acid, pimelic acid, suberic acid, azelaic acid, sebacic acid, undecanedioic acid, dodecanedioic acid, 3,3-dimethylpentanedioic acid, derivatives thereof, and the like. Among these, adipic acid and succinic acid are preferable, and succinic acid is particularly preferable.

Moreover, the aliphatic dicarboxylic acid and the derivative thereof also include hexahydrophthalic acid and a dimer acid which have an alicyclic structure, and derivatives thereof.

The aliphatic hydroxycarboxylic acid and the derivative thereof include glycolic acid, lactic acid, hydroxypivalic acid, hydroxycaproic acid, hydroxyhexanoic acid, and derivatives thereof.

These acid components may be esterified as in, for example, dimethyl terephthalate and bis-2-hydroxydiethyl terephthalate. Moreover, the acid components may be acid anhydrides as in phthalic anhydride and succinic anhydride. These can be used alone, or in combination of two or more thereof. The glass transition temperature of the obtained polyester can be controlled easily by copolymerization with the above-described additional acid component, and the oxygen absorption performance can be improved. Further, the solubility in an organic solvent can also be improved by controlling the crystallinity of the polyester resin.

Furthermore, the tetrahydrophthalic acid, the derivative thereof, the tetrahydrophthalic anhydride, or the derivative thereof is susceptible to a radical cross-linking reaction due to heat during the polymerization. Hence, when the compositional ratio of the tetrahydrophthalic acid, the derivative thereof, the tetrahydrophthalic anhydride, or the derivative thereof contained in the polyester is reduced by the additional acid component, the formation of a gel is suppressed during the polymerization, so that a resin having a high molecular weight can be obtained stably.

The oxygen-absorbing polyester-based resin (A) may further comprise a structural unit derived from a polyvalent alcohol, a polycarboxylic acid, a derivative thereof, or the like. The melt viscosity characteristic and the solution viscosity characteristic of the polyester dissolved in a solvent can be adjusted by introducing a polyvalent alcohol and a polycarboxylic acid and thereby controlling the branching structure.

The polyvalent alcohol and the derivative thereof include 1,2,3-propanetriol, sorbitol, 1,3,5-pentanetriol, 1,5,8-heptanetriol, trimethylolpropane, pentaerythritol, 3,5-dihydroxybenzyl alcohol, glycerin, and derivatives thereof.

The polycarboxylic acid and the derivative thereof include 1,2,3-propanetricarboxylic acid, meso-butane-1,2,3,4-tetracarboxylic acid, citric acid, trimellitic acid, pyromellitic acid, and derivatives thereof.

In addition, when a component having three or more functional groups such as a polyvalent alcohol or a polycarboxylic acid is copolymerized, the component is preferably within 5% by mole relative to all the acid components.

A polyester that can be obtained by copolymerizing the tetrahydrophthalic acid derivative or the tetrahydrophthalic anhydride derivative with 1,4-butanediol and succinic acid or succinic anhydride is preferable as the oxygen-absorbing polyester-based resin (A).

In this case, the ratio of the structural unit derived from the tetrahydrophthalic acid, the derivative thereof, the tetrahydrophthalic anhydride, or the derivative thereof contained in the oxygen-absorbing polyester-based resin (A) is 70 to 95% by mole, preferably 75 to 95% by mole, and more preferably 80 to 95% by mole, relative to all the acid components. Moreover, the ratio of the structural unit derived from succinic acid or succinic anhydride is 0 to 15% by mole, preferably 0 to 12.5% by mole, and more preferably 0 to 10% by mole, relative to all the acid components. Such compositional ratios make it possible to obtain a resin for an oxygen-absorbing adhesive which is excellent in oxygen absorption performance and adhesiveness, and excellent in solubility in an organic solvent.

The glass transition temperature of the oxygen-absorbing polyester-based resin (A) is $-20°$ C. to $10°$ C., preferably $-15°$ C. to $6°$ C., and more preferably $-12°$ C. to $2°$ C. When the glass transition temperature is within such a range, a sufficient oxygen absorption performance can be obtained.

The acid value of the oxygen-absorbing polyester-based resin (A) is preferably not more than 5 mgKOH/g, and more preferably not more than 1 mgKOH/g, in order to obtain a sufficient oxygen absorption performance. If the acid value of the polyester exceeds 5 mgKOH/g, a rapid autoxidation reaction is inhibited, so that a stable oxygen absorption performance cannot be obtained in some cases. Note that the method for measuring the acid value of the oxygen-absorbing polyester-based resin (A) is in accordance with JIS K 0070.

The oxygen-absorbing polyester-based resins (A) may be used alone, or may be used in combination of two or more kinds thereof.

The saturated polyester resin (B) is a polyester resin containing substantially no carbon-carbon double bond group, and can be obtained by, for example, polycondensation of a dicarboxylic acid component, a diol component, and a hydroxycarboxylic acid component. The saturated polyester resin (B) is preferably a polyester having an iodine value of not more than 3 g/100 g, and particularly a polyester of not more than 1 g/100 g. Note that the method for measuring the iodine value is in accordance with JIS K 0070. The iodine value of the saturated polyester resin (B) exceeding 3 g/100 g is not preferable because low-molecular-weight degradation components are likely to be formed by an oxygen absorption reaction of the oxygen-absorbing adhesive resin composition.

The dicarboxylic acid component includes the above-described aliphatic dicarboxylic acids, aromatic dicarboxylic acids, hexahydrophthalic acid, dimer acid, and derivatives thereof listed as the component of the oxygen-absorbing polyester-based resin (A), and the like. These can be used alone, or in combination of two or more thereof.

The diol component includes the above-described diols listed as the component of the oxygen-absorbing polyester-based resin (A). These can be used alone, or in combination of two or more thereof.

The hydroxycarboxylic acid component includes the aliphatic hydroxycarboxylic acids listed as the component of the oxygen-absorbing polyester-based resin (A), and the like.

A terminal functional group of the saturated polyester resin (B) is preferably a hydroxyl group because the curing proceeds together with the oxygen-absorbing polyester-based resin (A) owing to a curing agent such as an isocyanate-based curing agent, thereby increasing the cohesive force of the adhesive. Moreover, it is also preferable to modify a terminal alkyl group of the saturated polyester resin (B) by using a monoalcohol such as n-butanol or 2-ethylhexanol, a fatty acid, or the like.

The glass transition temperature of the saturated polyester resin (B) is $-10°$ C. or less, preferably $-70°$ C. to $-15°$ C., and more preferably $-60°$ C. to $-20°$ C. When the glass transition temperature is within such a range, an internal stress generated by an oxidative curing reaction following the oxygen absorption can be effectively relaxed.

In a preferred embodiment, the oxygen-absorbing adhesive resin composition is a composition comprising:
an oxygen-absorbing polyester-based resin (A) having a glass transition temperature of $-20°$ C. to $10°$ C.; and
a saturated polyester resin (B) having a glass transition temperature of $-10°$ C. or less.

The oxygen-absorbing polyester-based resin (A) and the saturated polyester resin (B) used in the present invention can be obtained by any method for polycondensation of a polyester known to those skilled in the art. Examples of the known method include interfacial polycondensation, solution polycondensation, melt polycondensation, and solid-state polycondensation.

A polymerization catalyst is not necessarily required for the synthesis of the oxygen-absorbing polyester-based resin (A) and the saturated polyester resin (B) used in the present invention. However, it is possible to use an ordinary polyester polymerization catalyst such as a titanium-based, germanium-based, antimony-based, tin-based, or aluminum-based polyester polymerization catalyst, for example. Alternatively, it is also possible to use a known polymerization catalyst such as a nitrogen-containing basic compound, boric acid, a boric acid ester, or an organic sulfonic acid-based compound.

Further, it is also possible to add various additives including an anti-coloring agent, an antioxidant, and the like, such as a phosphorus compound, for the polymerization. The addition of an antioxidant makes it possible to reduce oxygen absorption during the polymerization and subsequent processing, so that deterioration in performance of the oxygen-absorbing resin and the formation of a gel can be prevented.

The number average molecular weight of the oxygen-absorbing polyester-based resin (A) used in the present invention is preferably 500 to 100000, and more preferably 2000 to 10000. Meanwhile, the weight average molecular weight thereof is preferably 5000 to 200000, more preferably 10000 to 100000, and further preferably 20000 to 70000. If the molecular weights are below the above-described ranges, the cohesive force, i.e., the creep resistance, of the resin deteriorates. If the molecular weights exceed the above-described ranges, deterioration in coatability occurs because of decrease in solubility in an organic solvent or increase in solution viscosity. Hence, such molecular weights are not preferable.

The number average molecular weight of the saturated polyester resin (B) is preferably 500 to 100000, and more preferably 500 to 10000. Meanwhile, the weight average molecular weight thereof is preferably 1000 to 100000, more preferably 1000 to 70000, and further preferably 1000 to 50000. If the molecular weights are below the above-described ranges, the cohesive force remarkably deteriorates. If the molecular weights exceed the above-described ranges, deterioration in coatability occurs because of decrease in compatibility with the oxygen-absorbing polyester-based resin (A) or increase in solution viscosity. Hence, such molecular weights are not preferable. When the oxygen-absorbing polyester-based resin (A) and the saturated polyester resin (B) have molecular weights within the above-described ranges, it is possible to obtain an oxygen-absorbing adhesive resin composition which is excellent in cohesive force, adhesiveness, and solubility in an organic solvent, and which has viscosity characteristics preferable for an adhesive solution.

In the oxygen-absorbing adhesive resin composition of the present invention, or in the oxygen-absorbing adhesive layer of the oxygen-absorbing film, a ratio A/B of the oxygen-absorbing polyester-based resin (A) to the saturated polyester resin (B) is preferably 0.6 to 9, more preferably 1 to 9, and further preferably 2 to 9. When the ratio A/B is within such a range, a high laminate strength can be kept before and after the oxygen absorption, while an excellent oxygen absorption performance is exhibited.

Moreover, in order to accelerate the oxygen absorption reaction, a transition metal catalyst may be added to the oxygen-absorbing adhesive resin composition of the present invention or to the oxygen-absorbing adhesive layer of the oxygen-absorbing film. The transition metal catalyst includes transition metal salts made of organic acids and transition metals such as manganese, iron, cobalt, nickel, and copper. In the oxygen-absorbing adhesive resin composition of the present invention, or in the oxygen-absorbing adhesive layer of the oxygen-absorbing film, the amount of the transition metal catalyst is preferably 1 ppm to 1000 ppm, more preferably 10 ppm to 500 ppm, and further preferably 50 ppm to 200 ppm, in terms of the amount of the metal.

The oxygen-absorbing adhesive resin composition of the present invention is preferably blended with an isocyanate-based curing agent such as aliphatic and/or alicyclic isocyanate-based curing agents, followed by curing for use. In the oxygen-absorbing film of the present invention, the oxygen-absorbing adhesive layer preferably comprises an oxygen-absorbing adhesive resin composition obtained by blending a main agent comprising the oxygen-absorbing polyester-based resin (A) and the saturated polyester resin (B) with an isocyanate-based curing agent such as aliphatic and/or alicyclic isocyanate-based curing agents, followed by curing for use. Blending the isocyanate-based curing agent increases the adhesive strength and the cohesive force, and enables curing at low temperature around room temperature. Examples of the aliphatic isocyanate-based curing agent include xylylene diisocyanate (XDI), hexamethylene diisocyanate (HDI), lysine diisocyanate, lysine methyl ester diisocyanate, trimethylhexamethylene diisocyanate, n-pentane-1,4-diisocyanate, and the like. Examples of the alicyclic isocyanate-based curing agent include isophorone diisocyanate (IPDI), cyclohexane-1,4-diisocyanate, methylcyclohexyl diisocyanate, dicyclohexylmethane-4,4'-diisocyanate, and the like. Among these, XDI and HDI are preferable as the aliphatic isocyanate-based curing agent, and IPDI is preferable as the alicyclic isocyanate-based curing agent. XDI is particularly preferable. Using XDI, the oxygen-absorbing adhesive resin composition of the present invention or the oxygen-absorbing adhesive layer of the oxygen-absorbing film exhibits the most excellent oxygen absorption performance. Moreover, it is also preferable to use a combination of IPDI and XDI, IPDI and HDI, or the like. Aromatic isocyanate-based curing agents may also be used, but are not preferable because aromatic isocyanate-based curing agents deteriorate the oxygen absorption performance of the resin in some cases, although the adhesiveness and the cohesive force thereof are improved. This is presumably because aromatic urethane moieties formed by a reaction of an aromatic isocyanate-based curing agent with terminal hydroxyl groups of the polyester which is the main agent function to inactivate/stabilize radicals, as in the case of an aromatic amine which is an antioxidant.

These isocyanate-based curing agents are preferably used in the form of a polyisocyanate compound having an increased molecular weight, such as an adduct, an isocyanurate, or a biuret compound.

In addition, these isocyanate-based curing agents may be used alone, or may be used in combination of two or more thereof.

It is preferable to add the isocyanate-based curing agent component in an amount of 3 phr to 30 phr, more preferably 3 phr to 20 phr, and further preferably 3 phr to 15 phr, relative to the oxygen-absorbing adhesive resin composition, which is the main agent, in terms of parts by weight of the solid content. If the added amount is too small, the adhesiveness and the cohesive force are insufficient. If the added amount is too large, the amount of the oxygen-absorbable component blended per unit weight of the resin composition is so small that the oxygen absorption performance is insufficient. In addition, when the mobility of the resin is remarkably lowered by curing, the oxygen absorption reaction proceeds less readily, so that the oxygen absorption performance deteriorates.

In one embodiment, the oxygen-absorbing adhesive resin composition of the present invention has single glass transition temperature of −2° C. or less. In this case, an internal stress generated by an oxidative curing reaction following the oxygen absorption is effectively relaxed, and a sufficient transparency can also be ensured. The single glass transition temperature is more preferably −50° C. to −2° C., and further preferably −20° C. to −2° C.

The oxygen-absorbing adhesive resin composition of the present invention preferably comprises a solvent such as an organic solvent. The solvent includes ethyl acetate, acetone, methyl ethyl ketone, methyl isobutyl ketone, toluene, xylene, isopropanol, and the like. Particularly, ethyl acetate is generally used as a solvent of an adhesive for dry lamination of flexible packaging because ethyl acetate causes relatively few odor troubles due to residual solvent. Hence, a single solvent of ethyl acetate not containing toluene, xylene, or the like is preferably used as the solvent of the present invention, in consideration of industrial application.

If necessary, various additives such as a silane coupling agent, an antioxidant, an ultraviolet absorber, an anti-hydrolysis agent, a fungicide, a curing catalyst, a thickener, a plasticizer, a pigment, a filler, a polyester resin, and an epoxy resin can be added to the oxygen-absorbing adhesive resin composition of the present invention or to the oxygen-absorbing adhesive layer of the oxygen-absorbing film, unless the object of the present invention is not impaired.

The oxygen-absorbing adhesive resin composition of the present invention or the oxygen-absorbing adhesive resin composition constituting the oxygen-absorbing adhesive layer of the oxygen-absorbing film can be used for laminating multiple films, as in the case of ordinary adhesives for dry lamination. Particularly, the oxygen-absorbing adhesive resin compositions can be suitably used for laminating a film substrate having oxygen barrier property, and a sealant film having heat sealing property and oxygen gas permeability. In this case, the structure of the laminate includes an oxygen barrier substrate layer/the oxygen-absorbing adhesive layer/a sealant layer from the outer layer side. This structure is preferable because oxygen permeating and penetrating from the outside can be blocked by the oxygen barrier substrate, so that deterioration in oxygen absorption performance due to oxygen outside a container can be prevented, and because the oxygen-absorbing adhesive can rapidly absorb oxygen inside the container through the oxygen permeable sealant film.

Each of the film substrate having oxygen barrier property and the sealant film may a single layer or a laminate. As the film substrate having oxygen barrier property, it is possible to preferably use a biaxially oriented PET film, a biaxially oriented polyamide film, a biaxially oriented polypropylene film, or other similar films having, as a barrier layer, a vapor-deposited thin film of a metal or a metal oxide such as silica or alumina, or a barrier coating layer mainly composed of a gas-barrier organic material such as a polyvinyl alcohol-based resin, an ethylene-vinyl alcohol copolymer, a polyacrylic acid-based resin, or a vinylidene chloride-based resin. Moreover, an ethylene-vinyl alcohol copolymer film, a poly(meta-xylylene adipamide) film, a polyvinylidene chloride-based film, and a metal foil such as an aluminium foil are also preferable. It is also possible to use a laminate of substrates of a single kind or substrate of two or more kinds of these film substrates having oxygen barrier property. In addition, it is also preferable to use a laminate with a biaxially oriented PET film, a biaxially oriented polyamide film, a biaxially oriented polypropylene film, cellophane, paper, or the like.

As the material of the sealant film, it is possible to preferably use low-density polyethylene, medium-density polyethylene, high-density polyethylene, linear low-density polyethylene, linear very low-density polyethylene, polypropylene, poly-1-butene, poly-4-methyl-1-pentene, cyclic olefin polymers, cyclic olefin copolymers, polyolefins including random or block copolymers of α-olefins such as ethylene, propylene, 1-butene, and 4-methyl-1-pentene, and the like, ethylene-vinyl acetate copolymers, ethylene-(meth)acrylic acid copolymers, ionically cross-linked products (ionomers) thereof, ethylene-vinyl compound copolymers such as ethylene-methyl methacrylate copolymers, polyesters having heat sealing property such as PET, A-PET, PETG, and PBT, amorphous nylon, and the like. A blend of two or more of these materials can also be used, or a laminate of a single material or different materials can also be used.

A known dry laminator can be used to laminate multiple film substrates by using the oxygen-absorbing adhesive resin composition of the present invention. With a dry laminator, it is possible to carry out a series of laminating processes including application of the oxygen-absorbing adhesive resin composition onto a barrier film substrate, solvent vaporization with a drying oven, and lamination with a sealant film by nip rolls heated at 50 to 120° C. The amount of the oxygen-absorbing adhesive resin composition applied is 0.1 to 30 g/m$^2$, preferably 1 to 15 g/m$^2$, and further preferably 2 to 10 g/m$^2$, in terms of solid content. An oxygen-absorbing laminate film laminated by using the oxygen-absorbing adhesive resin composition is also preferably aged (cured) at a temperature around room temperature, for example, at 10 to 60° C., in order to promote the curing reaction. The curing is mainly caused by a cross-linking reaction with the isocyanate-based curing agent, and is preferable because the curing results in improved adhesive strength and cohesive force. Note that the aging is preferably conducted in the absence of oxygen, or while blocking oxygen, by tightly sealing the oxygen-absorbing laminate film with, for example, an oxygen-impermeable bag or the like. Thus, deterioration in oxygen absorption performance due to oxygen in air can be prevented during the aging.

Moreover, the oxygen-absorbing resin composition of the present invention can also be used as a solventless adhesive, without being dissolved in a solvent. In this case, the oxygen-absorbing laminate film can be obtained by using a known non-solvent laminator.

Further, the oxygen-absorbing resin composition of the present invention can be used not only in adhesive applications, but also in coating material applications, and can be applied as coating films for various films and the like.

The oxygen-absorbing film laminated by using the oxygen-absorbing adhesive resin composition of the present invention can be suitably used for bag-shaped containers with various forms and lid members for cup or tray containers. The bag-shaped containers include three-side or four-side sealed flat pouches, pouches with gusset, standing pouches, pillow packaging bags, and the like.

An oxygen-absorbing container in which the oxygen-absorbing film is used in at least a part of the container effectively blocks oxygen permeating from the outside of the container, and absorbs oxygen remaining in the container. For this reason, the oxygen-absorbing container is useful as a container which improves the shelf-life of a content by keeping the oxygen concentration in the container at a low level for a long period, and thus preventing deterioration in quality of the content due to oxygen.

Particularly, examples of contents susceptible to deterioration in the presence of oxygen include foods such as coffee beans, tea leaves, snacks, rice confectionery products, raw or semi-raw confectionery products, fruits, nuts, vegetables, fish and meat products, paste products, dried fish and meat, smoked foods, Tsukudani (Japanese simmered foods), raw rice, cooked rice products, infant foods, jams, mayonnaises, ketchups, edible oils, dressings, sources, and dairy products; beverages such as beers, wines, fruit juices, green teas, and coffees; other contents such as pharmaceuticals, cosmetics, and electronic components; and the like. However, the contents are not limited to these examples.

EXAMPLES

Hereinafter, the present invention will be described more specifically based on Examples. Values were measured by the following methods.

(1) Number Average Molecular Weight (Mn) and Molecular Weight Distribution Index (Mw/Mn)

Measurement was conducted by gel permeation chromatography (GPC, an HLC-8120 model GPC manufactured by Tosoh Corporation) in terms of polystyrene. Chloroform was used as the solvent.

(2) Amount of Oxygen Absorbed

A test piece of 2 cm×15 cm cut from a laminate film was placed in an oxygen-impermeable steel foil laminate cup having an internal volume of 85 cm$^3$, tightly sealed with an aluminium foil laminate film lid by heat sealing, and stored in an atmosphere of 22° C. The oxygen concentration in the cup after a 7-day storage was measured with a micro gas chromatograph (Micro GC 3000A manufactured by INFI-CON, Inc.), and the amount of oxygen absorbed per square centimeter of the film was calculated. The amount of 0.01 ml/cm$^2$ or more was evaluated as good, whereas the amount less than 0.01 ml/cm$^2$ was evaluated as poor.

(3) Laminate Strength

Using a test piece having a width of 15 mm and a length of 200 mm (including a non-adhering section of 50 mm), the laminate strength (unit: N/15 mm) between an aluminium foil and LDPE with an oxygen-absorbing adhesive (thickness: 4 μm) was measured by a T-peel test according to JIS K 6854-3 in an atmosphere of 23° C. and 50% RH under a measurement condition: peeling speed of 300 mm/min. Here, the laminate strength not less than 1 N/15 mm was evaluated as good, whereas the laminate strength less than 1 N/15 mm was evaluated as poor.

(4) Glass Transition Temperature (Tg)

The Tg of an oxygen-absorbing polyester resin (A), saturated polyester resins (B and C), and an oxygen-absorbing adhesive resin composition were measured according to JIS K 7121 by using a differential scanning calorimeter (DSC6220 manufactured by Seiko Instruments Inc.) in which each sample was maintained under conditions of a nitrogen stream at −70° C. for 10 minutes and then the temperature was increased at a rate of 10° C./minute.

Example 1

A methyltetrahydrophthalic anhydride isomer mixture (Hitachi Chemical Co., Ltd.; HN-2200) as an acid component at a molar ratio of 0.9, succinic anhydride as an additional acid component at a molar ratio of 0.1, 1,4-butanediol as a diol component at a molar ratio of 1.3, and 300 ppm of isopropyl titanate as a polymerization catalyst were prepared, and allowed to react with one another for approximately 6 hours in a nitrogen atmosphere at 150° C. to 200° C., while the produced water was being removed. Subsequently, polymerization was conducted under a reduced pressure of 0.1 kPa at 200 to 220° C. for approximately 3 hours. Thus, an oxygen-absorbing polyester resin (A) was obtained. Here, the Mn was 3400, the Mw was 52600, and the Tg was −5.0° C.

The obtained oxygen-absorbing polyester resin (A) was mixed with a saturated polyester resin (B1) (POLYCIZER W4010 manufactured by DIC Corporation, Mn: 3600, Mw: 9500) having a Tg of −26° C. in such a manner that a solid content weight ratio A/B1 was 2.3. The solid content of the mixture was mixed with an HDI/IPDI curing agent (KL-75 manufactured by DIC Graphics Corporation) as an isocyanate-based curing agent in an amount of 7 phr (parts per hundred resin) in terms of solid content. Further, as a catalyst, cobalt neodecanoate was added thereto in an amount of 80 ppm in terms of metal relative to the total solid content. The resultant was dissolved in ethyl acetate. Thus, an ethyl acetate solution of an oxygen-absorbing adhesive resin composition (a) was prepared with a solid content concentration of 20 wt %. This solution of the oxygen-absorbing adhesive resin composition (a) was applied by using a #16 bar coater onto an aluminium foil surface of a laminate film including a biaxially oriented PET film (thickness: 12 μm)/an urethane-based adhesive (thickness: 4 μm)/an aluminium foil (thickness: 7 μm). The solvent was evaporated with hot air of a hair dryer, and then the laminate film and a 30-μm LDPE film were passed through hot rolls at 70° C., while the surface of the laminate film on which the adhesive was applied was being faced to a corona-treated surface of the 30-μm LDPE film. Thus, an oxygen-absorbing laminate film was obtained which included the biaxially oriented PET film (thickness: 12 μm)/the urethane-based adhesive (thickness: 4 μm)/the aluminium foil (thickness: 7 μm)/the oxygen-absorbing adhesive (a) (thickness: 4 μm)/the LDPE (thickness: 30 μm).

The obtained oxygen-absorbing laminate film was cured at 35° C. in a nitrogen atmosphere for 5 days, and then subjected to the evaluation of the amount of oxygen absorbed, the Tg measurement of the oxygen-absorbing adhesive resin composition, and the evaluation of the laminate strength before the oxygen absorption and after the oxygen absorption under acceleration conditions of 40° C. and 1 week. Table 1 shows the results. Further, the oxygen-absorbing laminate film was subjected to the evaluation of the laminate strength after the oxygen absorption under acceleration conditions of 40° C. and 2 months, and the evaluation of the Tg measurement of the oxygen-absorbing adhesive resin composition after the oxygen absorption at 40° C. for 2 months. Table 2 shows the results.

Example 2

A solution of an oxygen-absorbing adhesive resin composition (b) was prepared in the same manner as in Example 1, except that the oxygen-absorbing polyester resin (A) was mixed with a saturated polyester resin (B2) (tesurakku 2506-63 manufactured by Hitachi Kasei Polymer Co., Ltd., Mn: 9700, Mw: 26000) having a Tg of −24° C. in such a manner that a solid content weight ratio A/B2 was 1.0. Then, an oxygen-absorbing film was fabricated, and subjected to the evaluations after curing. Tables 1 and 2 show the results.

Example 3

A solution of an oxygen-absorbing adhesive resin composition (c) was prepared in the same manner as in Example 1, except that the oxygen-absorbing polyester resin (A) was mixed with a saturated polyester resin (B3) (DICDRY LX-75A manufactured by DIC Corporation, Mn: 7400, Mw: 23000) having a Tg of −21° C. in such a manner that a solid content weight ratio A/B3 was 1.0. Then, an oxygen-absorbing film was fabricated, and subjected to the evaluations after curing. Tables 1 and 2 show the results.

Example 4

A solution of an oxygen-absorbing adhesive resin composition (d) was prepared in the same manner as in Example 1, except that the oxygen-absorbing polyester resin (A) was mixed with a saturated polyester resin (B4) (tesurakku TA22-781 manufactured by Hitachi Kasei Polymer Co., Ltd., Mn: 1000, Mw: 4500) having a Tg of −52° C. in such a manner that a solid content weight ratio A/B4 was 2.3. Then, an oxygen-absorbing film was fabricated, and subjected to the evaluations after curing. Tables 1 and 2 show the results.

Comparative Example 1

A solution of an oxygen-absorbing adhesive resin composition (e) was prepared in the same manner as in Example 1, except that no saturated polyester resin was mixed. Then, an oxygen-absorbing film was fabricated, and subjected to the evaluations after curing. Tables 1 and 2 show the results.

Comparative Example 2

A solution of an oxygen-absorbing adhesive resin composition (f) was prepared in the same manner as in Example 1, except that the oxygen-absorbing polyester resin (A) was mixed with a saturated polyester resin (C1) (DICDRY LX-520 manufactured by DIC Graphics Corporation, Mn: 8200, Mw: 20000) having a Tg of 4° C. in such a manner that a solid content weight ratio A/C1 was 2.3. Then, an oxygen-absorbing film was fabricated, and subjected to the evaluations after curing. Tables 1 and 2 show the results.

Comparative Example 3

A solution of an oxygen-absorbing adhesive resin composition (g) was prepared in the same manner as in Example 1, except that the oxygen-absorbing polyester resin (A) was mixed with a saturated polyester resin (C2) (DICDRY LX-703VL manufactured by DIC Graphics Corporation, Mn: 7500, Mw: 17500) having a Tg of −9° C. in such a manner that a solid content weight ratio A/C2 was 2.3. Then, an oxygen-absorbing film was fabricated, and subjected to the evaluations after curing. Tables 1 and 2 show the results.

The invention claimed is:
1. An oxygen-absorbing film comprising an oxygen-absorbing adhesive layer made of an oxygen-absorbing adhesive resin composition cured at 35° C. in a nitrogen atmosphere, wherein:
the oxygen-absorbing adhesive resin composition has at least two glass transition temperatures after exposure to oxygen at 40° C. for two months, the lowest glass transition temperature thereof is less than 0° C., the oxygen-absorbing film has a single-phase compatible system prior to said oxygen exposure, the oxygen-absorbing adhesive resin composition comprises a cured oxygen-absorbing polyester-based resin (A) and a component containing a saturated polyester resin (B) having a glass transition temperature of −10° C. or less, a ratio A/B of the oxygen-absorbing polyester-based resin (A) to the saturated polyester resin (B) is 1 to 9, and a laminate strength of the film is not less than 1N/15 mm in a T-peel test at a peeling speed of 300 mm/min, the cured oxygen-absorbing adhesive resin composition is obtained by blending the oxygen-absorbing polyester-based resin (A) and the saturated polyester resin (B) with a polyisocyanate compound in an amount of 3 phr to 15 phr, wherein the polyisocyanate compound is an adduct or an isocyanurate comprising at least one of isophorone diisocyanate (IPDI), hexamethylene diisocyanate (HDI), and xylylene diisocyanate (XDI),

TABLE 1

| | Oxygen-absorbing adhesive resin composition | Glass transition temperature Tg (° C.) | Oxygen absorption performance (ml/cm2 @ 22° C.) 7-day period | Evaluation | Laminate strength (N/15 mm @ 23° C.) Before oxygen absorption | After oxygen absorption, 40° C., 7days | Evaluation | Overall evaluation |
|---|---|---|---|---|---|---|---|---|
| Example 1 | (a) | −13.2 | 0.034 | ○ | 3.3 | 2.4 | ○ | ○ |
| Example 2 | (b) | −14.1 | 0.017 | ○ | 3.6 | 3.2 | ○ | ○ |
| Example 3 | (c) | −10.5 | 0.021 | ○ | 2.8 | 2.7 | ○ | ○ |
| Example 4 | (d) | −14.8 | 0.034 | ○ | 3.9 | 2.7 | ○ | ○ |
| Comparative Example 1 | (e) | −1.5 | 0.034 | ○ | 4 | 0.6 | x | x |
| Comparative Example 2 | (f) | −0.3 | 0.027 | ○ | 5.7 | 0.7 | x | x |
| Comparative Example 3 | (g) | −1.5 | 0.028 | ○ | 3.7 | 0.6 | x | x |

TABLE 2

| | Oxygen-absorbing adhesive resin composition | Glass transition temperature Tg (° C.) After oxygen absorption, 40° C., 2 months | Laminate strength (N/15 mm @23° C.) After oxygen absorption, 40° C., 2 months | Evaluation |
|---|---|---|---|---|
| Example 1 | (a) | −11.1, 19.1 | 1.6 | ○ |
| Example 2 | (b) | −14.5, 21.8 | 2.7 | ○ |
| Example 3 | (c) | −18.2, 27.0 | 3 | ○ |
| Comparative Example 1 | (e) | 25.9 | 0.6 | x |
| Comparative Example 2 | (f) | 24.3 | 0.7 | x |
| Comparative Example 3 | (g) | 5.4, 28.3 | 0.6 | x | the oxygen-absorbing polyester-based resin (A) further comprises a transition metal catalyst, in an amount of 50 ppm to 1000 ppm with respect to an amount of the transition metal,
the oxygen-absorbing polyester-based resin (A) is made from a tetrahydrophthalic acid, a derivative thereof, a tetrahydrophthalic anhydride, or a derivative thereof, and a diol component selected from the group consisting of trimethylene glycol, 1,4-butanediol, 1,6-hexanediol, neopentyl glycol, and derivatives thereof, and the saturated polyester resin (B) contains a structural unit derived from a diol component selected from the group consisting of trimethylene glycol, 1,4-butanediol, 1,6-hexanediol, neopentyl glycol, and derivatives thereof and a structural unit derived from a dicarboxylic acid component selected from the group consisting of adipic acid, sebacic acid, isophthalic acid, and combinations thereof.

2. The oxygen-absorbing film according to claim 1, comprising at least an oxygen barrier film layer, the oxygen-absorbing adhesive layer, and a sealant film layer.

3. The oxygen-absorbing film according to claim 1 wherein the cured oxygen-absorbing adhesive resin composition comprises: an oxygen-absorbing polyester-based resin (A) having a glass transition temperature of −20° C. to 10° C.; and wherein:
a ratio A/B of the oxygen-absorbing polyester-based resin (A) to the saturated polyester resin (B) is 1.5 to 9,
the glass transition temperature of the saturated polyester resin (B) is lower than the glass transition temperature of the oxygen-absorbing polyester-based resin (A), and the oxygen-absorbing adhesive resin composition has separate phases with glass transition temperatures of at least the oxygen-absorbing polyester-based resin (A) and the saturated polyester resin (B).

4. The oxygen-absorbing film according to claim 3, wherein the saturated polyester resin (B) further comprises a structural unit derived from a hydroxycarboxylic acid component.

5. The oxygen-absorbing film according to claim 3, wherein the saturated polyester resin (B) has an iodine value of 3 g/100 g or less measured in accordance with JIS K 0070.

6. The oxygen-absorbing film according to claim 3, wherein the saturated polyester resin (B) has an iodine value of 1 g/100 g or less measured in accordance with JIS K 0070.

7. The oxygen-absorbing film according to claim 1 wherein the cured oxygen-absorbing adhesive resin composition comprises:
an oxygen-absorbing polyester-based resin (A) having a glass transition temperature of −20° C. to 10° C.; and;
wherein: a ratio A/B of the oxygen-absorbing polyester-based resin (A) to the saturated polyester resin (B) is 1.5 to 9,
the glass transition temperature of the saturated polyester resin (B) is lower than the glass transition temperature of the oxygen-absorbing polyester-based resin (A), and the oxygen-absorbing adhesive resin composition has a single-phase compatible system when the oxygen absorption starts, but has separated glass transition temperatures of two or more components due to reaction-induced phase separation following an oxygen absorption reaction.

8. The oxygen-absorbing film according to claim 1 wherein the polyisocyanate compound is an adduct of HDI/IPDI.

9. The oxygen-absorbing film according to claim 1 wherein the polyisocyanate compound is an adduct of IPDI/XDI.

10. The oxygen-absorbing film according to claim 1 wherein the polyisocyanate compound is an isocyanurate of XDI.

11. The oxygen-absorbing film according to claim 1, wherein the amount transition metal catalyst is 50 ppm to 500 ppm with respect to the amount of the transition metal.

12. The oxygen-absorbing film according to claim 1, wherein the amount transition metal catalyst is 50 ppm to 200 ppm with respect to the amount of the transition metal.

* * * * *